(12) United States Patent
Delaigue et al.

(10) Patent No.: US 12,431,684 B2
(45) Date of Patent: Sep. 30, 2025

(54) LASER SYSTEM WITH TEMPORAL OVERLAP OF PULSES

(71) Applicant: AMPLITUDE, Pessac (FR)

(72) Inventors: Martin Delaigue, Bordeaux (FR); Clemens Honninger, Cestas (FR); Eric Audouard, Solignac-sous-Roche (FR)

(73) Assignee: AMPLITUDE, Pessac (FR)

( * ) Notice: Subject to any disclaimer, the term of this patent is extended or adjusted under 35 U.S.C. 154(b) by 1093 days.

(21) Appl. No.: 17/428,429

(22) PCT Filed: Feb. 4, 2020

(86) PCT No.: PCT/FR2020/050185
§ 371 (c)(1),
(2) Date: Aug. 4, 2021

(87) PCT Pub. No.: WO2020/161433
PCT Pub. Date: Aug. 13, 2020

(65) Prior Publication Data
US 2022/0109281 A1    Apr. 7, 2022

(30) Foreign Application Priority Data
Feb. 4, 2019 (FR) ..................... 1901066

(51) Int. Cl.
*H01S 3/23*    (2006.01)
*H01S 3/00*    (2006.01)
(Continued)

(52) U.S. Cl.
CPC .......... *H01S 3/2308* (2013.01); *H01S 3/0057* (2013.01); *H01S 3/0085* (2013.01);
(Continued)

(58) Field of Classification Search
CPC .... H01S 3/2308; H01S 3/0057; H01S 3/0085; H01S 3/0092
See application file for complete search history.

(56) References Cited

U.S. PATENT DOCUMENTS

2005/0041976 A1    2/2005  Sun
2005/0226287 A1*  10/2005  Shah ............... H01S 3/0014
                                                        372/25
(Continued)

FOREIGN PATENT DOCUMENTS

EP    2 548 690        1/2013
JP    2007503125 A     2/2007
(Continued)

OTHER PUBLICATIONS

International Search Report for PCT/FR2020/050185 dated May 25, 2020, 5 pages with English Translation.
(Continued)

*Primary Examiner* — Eric L Bolda
(74) *Attorney, Agent, or Firm* — NIXON & VANDERHYE (57) ABSTRACT

Disclosed is a pulse laser system including an injection system, an optical amplifier system and a beam combiner, the pulse laser system being designed to generate, on the one hand, an amplified pulse of short duration between 100 fs and a few hundred picoseconds and, on the other hand, another amplified pulse of long duration between a few picoseconds and several hundred nanoseconds, the amplified pulse of short duration and the other amplified pulse of long duration being from the same optical amplifier system and the amplified pulse of short duration being temporally overlapped with a relative delay with the other amplified pulse of long duration, the relative delay being less than or equal to the long duration.

20 Claims, 6 Drawing Sheets

(51) Int. Cl.
    *H01S 3/067*     (2006.01)
    *H01S 3/0941*    (2006.01)

(52) U.S. Cl.
    CPC ........ *H01S 3/0092* (2013.01); *H01S 3/09415* (2013.01); *H01S 3/06754* (2013.01)

(56) References Cited

U.S. PATENT DOCUMENTS

| | | |
|---|---|---|
| 2008/0080859 A1 | 4/2008 | Kagawa |
| 2010/0040095 A1* | 2/2010 | Mielke ................. H01S 3/2308 372/25 |
| 2011/0139760 A1* | 6/2011 | Shah ..................... H01S 3/0057 219/121.6 |
| 2013/0008880 A1 | 1/2013 | Ota |
| 2013/0083816 A1 | 4/2013 | Kubo |
| 2014/0036370 A1 | 2/2014 | Liu |
| 2015/0097118 A1* | 4/2015 | Zheng ..................... G01J 11/00 250/341.1 |
| 2017/0141530 A1 | 5/2017 | Courjaud |
| 2018/0309258 A1 | 10/2018 | Honninger |
| 2019/0025614 A1 | 1/2019 | Teranishi |
| 2019/0252190 A1* | 8/2019 | Ohkubo ............... H01S 3/09702 |
| 2020/0343682 A1 | 10/2020 | Honninger |

FOREIGN PATENT DOCUMENTS

| | | |
|---|---|---|
| JP | 2008523619 A | 7/2008 |
| JP | 2008-205486 | 9/2008 |
| JP | 2008205486 A | 9/2008 |
| JP | 2013083970 A | 5/2013 |
| JP | 2017520806 A | 7/2017 |
| JP | 2018531524 A | 10/2018 |
| KR | 20120130783 A | 12/2012 |
| WO | 2006062744 A2 | 6/2006 |
| WO | 2011115243 A1 | 9/2011 |
| WO | 2019138192 A1 | 7/2019 |

OTHER PUBLICATIONS

Written Opinion of the ISA for PCT/FR2020/050185 dated May 25, 2020, 9 pages with English Translation.

Magne et al., "Generation of a 4×100 GHz pulse-train from a single-wavelength 10-GHz mode-locked laser using superimposed fiber Bragg gratings and nonlinear conversion", Journal of Lightwave Technology, vol. 24, No. 5, May 2006, pp. 2091-2099.

Office Action, issued in Japanese Patent Application No. 2021-545476 dated Aug. 22, 2023.

Office Action, issued in Korean Patent Application No. 10-2021-7024659 dated Feb. 27, 2024.

* cited by examiner

LASER SYSTEM WITH TEMPORAL OVERLAP OF PULSES

This application is the U.S. national phase of International Application No. PCT/FR2020/050185 filed Feb. 4, 2020 which designated the U.S. and claims priority to FR Patent Application No. 1901066 filed Feb. 4, 2019, the entire contents of each of which are hereby incorporated by reference.

The present invention concerns the technical field of the systems and methods based on laser pulses.

In the above field, different types of pulsed lasers are known. The semiconductor lasers or laser diodes deliver pulses having a duration in the nanosecond range. The chirped pulse amplification laser systems allow obtaining pluses which are short in the picosecond range or even ultra-short pulses having a duration comprised between about 100 fs to a few hundred femtoseconds.

The pulsed lasers generally operate at a rate or emitted pulse repetition frequency which technically depends on the used architecture and must generally be adapted to the considered application.

In the present document, the term "duration of a pulse" means the full width at half maximum of the temporal intensity profile of the pulse.

The pulse laser systems find many applications, for example in the machining of materials by drilling, cutting and/or surfacing. The optimisation of each laser method depends on a set of laser parameters including in particular: the energy, the wavelength, the pulse duration and the pulse rate. In this field, the use of pulses with a duration of a few picoseconds or sub-picosecond has allowed considerably extending the range of applications of the lasers, due to the implementation of laser-matter interaction phenomena which are different in picosecond regime and femtosecond (also called sub-picosecond) regime.

The spatial overlap of successive pulses over time, associated with a spatial coverage rate of the spots on the sample, is a well-known technique and is used in many methods.

The use of a time-shifted double pulse has been the subject of numerous studies.

Figure 1:
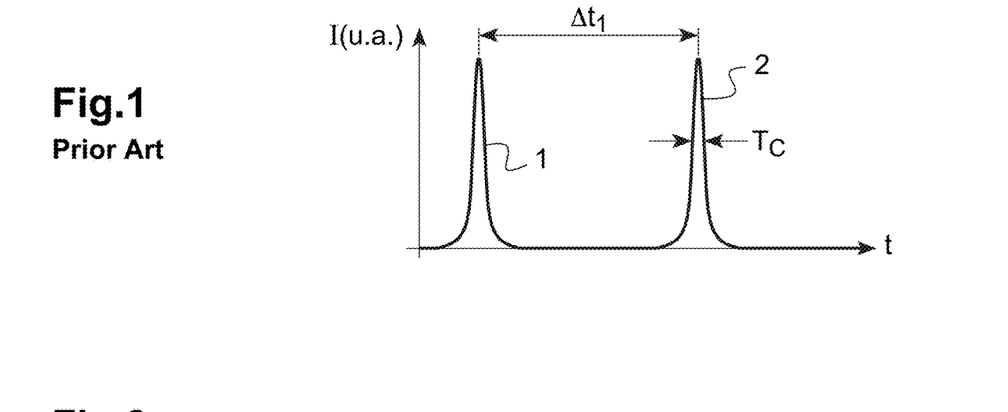

FIG. 1 schematically illustrates the emission by a laser of the prior art, of laser pulses as a function of time. The laser delivers pulses separated by a period $\Delta t_1$, between a pulse 1 and the following pulse 2. The period $\Delta t_1$ is generally adjustable. The successive laser pulses 1, 2 generally have the same duration Tc which is less than or much less than the period $\Delta t_1$.

Recently, the use of periodic pulse trains (called "burst") has resulted in new applications. The energy of a pulse burst may or may not be adjustable. The successive bursts are temporally separated by an adjustable or non-adjustable duration, depending on the applications.

However, it is intended to improve the accuracy and/or the speed of laser machining methods without increasing the complexity of the laser systems.

The invention proposes a pulse laser system comprising an injection system, an optical amplifier system and a beam combiner, the pulse laser system being adapted to generate, on the one hand, an amplified pulse of short duration comprised between 100 fs and a few hundred picoseconds and, on the other hand, another amplified pulse of long duration or respectively a burst of other pulses amplified at a gigahertz frequency having a long duration envelope, the long duration being greater than the short duration and the long duration being comprised between a few picoseconds and several hundred nanoseconds, the amplified pulse of short duration and the other amplified pulse of long duration or respectively the burst of other amplified pulses of long duration envelope being from the same optical amplifier system and, the amplified pulse of short duration being, at the output of the pulse laser system, temporally overlapped with a relative delay with the other amplified pulse of long duration or respectively the burst of other amplified pulses of long duration envelope, the relative delay being less than or equal to the long duration.

Advantageously, the short duration is comprised between 100 fs and a few hundred femtoseconds and the long duration is comprised between five nanoseconds and several hundred nanoseconds.

Preferably, the long duration pulse starts before the short duration pulse. Thus, the long duration pulse heats the material to prepare it before the application of the short duration pulse. The heating induces a modification of the ablation threshold of the material. The short duration pulse is overlapped on the long pulse with a delay less than the duration of the long pulse. The short duration pulse ablates the material with an increased efficiency relative to a short pulse applied alone, without temporal overlap with a long pulse.

The invention finds applications in particular in the drilling of transparent materials, the cutting of transparent materials and/or the surfacing of transparent materials.

According to a first embodiment, the injection system is adapted to generate a source pulse, the optical amplifier system is adapted to receive the source pulse and to generate an amplified pulse, the pulse laser system comprising a beam splitter having an input branch, an output branch and another output branch, the beam splitter being disposed to divide the amplified pulse and form a divided amplified pulse on the output branch and another divided amplified pulse on the other output branch, a compressor being disposed on the output branch and adapted to receive the divided amplified pulse and generate a compressed amplified pulse of short duration, an optical delay line being disposed on the output branch or on the other output branch to induce the relative delay and the beam combiner having an input connected to the output branch of the beam splitter in order to receive the compressed amplified pulse of short duration and another input connected to the other output branch of the beam splitter in order to receive the other divided amplified pulse of long duration.

Advantageously, the short duration compressed amplified pulse has a duration comprised between 100 fs and a few hundred femtoseconds and the other long duration divided amplified pulse has a duration comprised between five nanoseconds and several hundred nanoseconds.

According to a particular aspect of the first embodiment, the pulse laser system further includes another compressor disposed on the other output branch upstream of the beam combiner, the other compressor being adapted to temporally compress the other divided amplified pulse.

According to another particular aspect of the first embodiment, the pulse laser system includes a nonlinear optical system disposed on the other output branch of the beam splitter upstream of the beam combiner, the nonlinear optical system being adapted to wavelength-convert the other divided amplified pulse.

According to a second embodiment, the injection system comprises an injector, another injector and an electronic synchronisation system between the injector and the other injector, the injector being adapted to generate a source pulse of short duration comprised between 100 fs and a few hundred picoseconds, the other injector being adapted to generate another source pulse of long duration, the long duration being comprised between 5 ns and several hundred ns, the electronic synchronisation system being adapted to induce a delay between the source pulse and the other source pulse which is less than or equal to the long duration, the beam combiner being adapted to spatially and temporally overlap the source pulse and the other source pulse, the optical amplifier system being adapted to receive the source pulse and the other source pulse which are temporally overlapped and to generate an amplified pulse of short duration and another amplified pulse of long duration which are temporally overlapped.

Advantageously, the short duration source pulse has a duration comprised between 100 fs and a few hundred femtoseconds.

Optionally, in the second embodiment, the pulse laser system includes a compressor disposed downstream of the optical amplifier system, the compressor being adapted to receive the amplified pulse of short duration and generate a compressed amplified pulse of short duration.

According to another particular aspect of the second embodiment, the other injector includes an oscillator or a laser diode or an integrated circuit laser source.

According to another embodiment, the injection system comprises an injector, a gigahertz source and an electronic synchronisation system between the injector and the gigahertz source, the injector being adapted to generate a source pulse of short duration comprised between 100 fs and a few hundred picoseconds, the gigahertz source being adapted to generate a burst of other gigahertz source pulses having a long duration envelope comprised between 5 ns and several hundred ns, the electronic synchronisation system being adapted to induce a delay between the source pulse and the gigahertz source pulse burst, the beam combiner being adapted to spatially and temporally overlap the source pulse and the burst of other gigahertz source pulses, the optical amplifier system being adapted to receive the source pulse and the burst of other gigahertz source pulses which are temporally overlapped and to generate the amplified pulse which is temporally overlapped with the burst of other amplified pulses, a compressor being adapted to receive the amplified pulse and generate a compressed amplified pulse.

Advantageously, in this embodiment, the short duration source pulse has a duration comprised between 100 fs and a few hundred femtoseconds.

According to a particular aspect of the second embodiment, the injector includes an oscillator and an optical modulator.

According to another particular aspect of the second embodiment, the pulse laser system comprises an optical delay device disposed upstream of the beam combiner.

According to another particular aspect of any one of the embodiments, the pulse laser system includes an optical attenuator or an optical modulator adapted to amplitude modulate the amplified pulse of short duration and/or the other amplified pulse, respectively the burst of other amplified pulses.

According to another particular aspect, the beam combiner is one selected from an optical coupler, a polariser, a dichroic component, an interference filter or a nonlinear optical component.

According to another particular aspect, the pulse laser system includes a nonlinear optical frequency converter disposed to receive the amplified pulse of short duration and generate a wavelength-converted amplified pulse of short duration.

Of course, the different features, variants and embodiments of the invention can be associated with each other according to various combinations insofar as they are not incompatible or exclusive to each other.

In addition, various other features of the invention emerge from the appended description performed with reference to the drawings which illustrate non-limiting embodiments of the invention and where:

FIG. 1 schematically represents short or ultra-short successive laser pulses generated by a laser system of the prior art, FIG. 2 schematically represents a laser system with temporally overlapped pulses according to a first embodiment, FIG. 3 schematically represents a laser system with temporally overlapped pulses according to a variant of the first embodiment, FIG. 4 schematically represents the energy of a short pulse and a long pulse, temporally overlapped with a relative delay $\Delta t_2$, according to the first embodiment, FIG. 5 schematically represents a laser system with temporally overlapped pulses according to a second embodiment, FIG. 6 schematically represents an example of an injector used in the second embodiment, FIG. 7 schematically represents another example of an injector used in a variant of the second embodiment, FIG. 8 schematically represents the energy of one or more short pulse(s) and one long pulse, spatially and temporally overlapped with a relative $\Delta t_2$ according to the second embodiment, FIG. 9 schematically represents the energy of a pulse burst having a long envelope and a short pulse, temporally overlapped with a relative delay $\Delta t_2$ according to a variant of the second embodiment.

It should be noted that in these figures the structural and/or functional elements common to the different variants may have the same references.

Different embodiments are described in detail.

In the remainder of the present document, the architecture of the pulse laser system is partly based on a chirped pulse amplification. In this type of architecture, a stretcher temporally stretches a pulse by using the spectral properties of that pulse, an optical amplifier system amplifies the stretched pulse to generate an amplified pulse of high energy, and a compressor at the end of the chain temporally recompresses the amplified pulse to generate a high-power ultra-short pulse.

Figure 2:
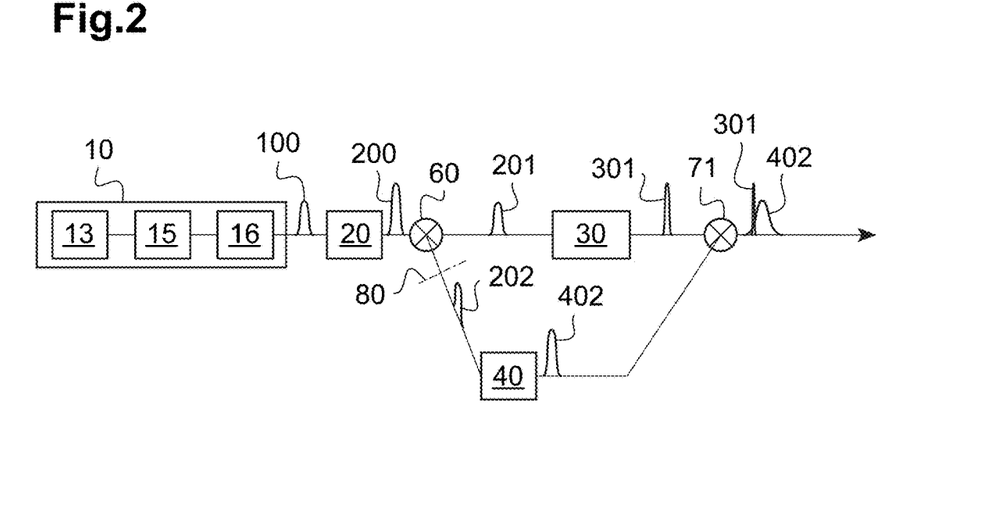

FIG. 2 schematically represents a first embodiment of a pulse laser system.

More specifically, according to the first embodiment, the pulse laser system comprises an injection system 10, an optical amplifier system 20, a beam splitter 60, a compressor 30, an optical delay line 40 and a beam combiner 71.

The injection system 10 comprises an oscillator 13, a stretcher 15 and an optical modulator 16. The oscillator 13 generates pulses at a rate up to about 100 MHz. The stretcher 15 temporally stretches each pulse of the oscillator while maintaining the same rate. The optical modulator 16 allows selecting one or more source pulse(s) 100 upstream of the optical amplifier system 20.

For example, the optical amplifier system 20 receives a source pulse 100, amplifies it and delivers an amplified pulse 200. The optical amplifier system 20 includes one or more optical amplifier(s), for example a preamplifier followed by a power optical amplifier. The amplified pulse 200 may have a shorter duration than the source pulse 100, by spectral narrowing effect of the pulse in the amplifying medium when the gain bandwidth of the amplifying medium is narrower than the spectral width of the source pulse 100. Alternatively, the amplified pulse 200 may have a duration similar to that of the source pulse 100.

The beam splitter 60 is preferably a passive optical component. By way of example, the beam splitter 60 comprises an amplitude coupler-splitter having at least one input branch and two output branches. The beam splitter 60 receives the amplified pulse 200 on the input branch. The beam splitter 60 is adapted to amplitude divide the amplified pulse 200 into a divided amplified pulse 201 being propagated on one output branch and another divided amplified pulse 202 being propagated on another output branch. Alternatively, the beam splitter 60 comprises a polarising device, for example a polariser and/or a phase plate, configured to polarisation-split the amplified pulse 200 into a divided amplified pulse 201 according to a polarisation state and another divided amplified pulse 202 according to another polarisation state. According to another variant, the beam splitter 60 comprises a dichroic mirror or an interference filter, adapted to wavelength-split the amplified pulse 200 into a divided amplified pulse 201 at one wavelength and another divided amplified pulse 202 at another wavelength.

Advantageously, the beam splitter 60 allows varying and adjusting the amplitude of the divided amplified pulse 201 relative to the amplitude of the other divided amplified pulse 202. Optionally, an attenuator 80 is disposed on one or the other of the output branches. This attenuator 80 allows adjusting the amplitude of the divided amplified pulse 201 relative to the amplitude of the other divided amplified pulse 202 independently of the beam splitter 60.

In the embodiment illustrated in FIG. 2, the divided amplified pulse 201 is directed on an output branch of the beam splitter 60 to the compressor 30 while the other divided amplified pulse 202 is directed on another output branch of the beam splitter 60 to the optical delay line 40. The compressor 30 receives the divided amplified pulse 201 and delivers a compressed amplified pulse 301 which is of short duration. The duration Tc of the compressed amplified pulse 301 is comprised between 100 fs and a few ps. Particularly advantageously, the duration Tc of the compressed amplified pulse 301 is comprised between 100 fs and a few hundred femtoseconds. The optical delay line 40 receives the other divided amplified pulse 202, without passing through the compressor 30, and transmits a delayed amplified pulse 402 having a long duration, denoted $T_L$, comprised between a few ps and 1 ns, with a delay $\Delta t_2$ less than or equal to the duration $T_L$ of the delayed amplified pulse 402 of long duration. In the same laser system according to the present disclosure, the duration ratio between the long pulse and the short pulse is comprised between 1 and 10000, its value being determined depending on the application.

Figure 3:
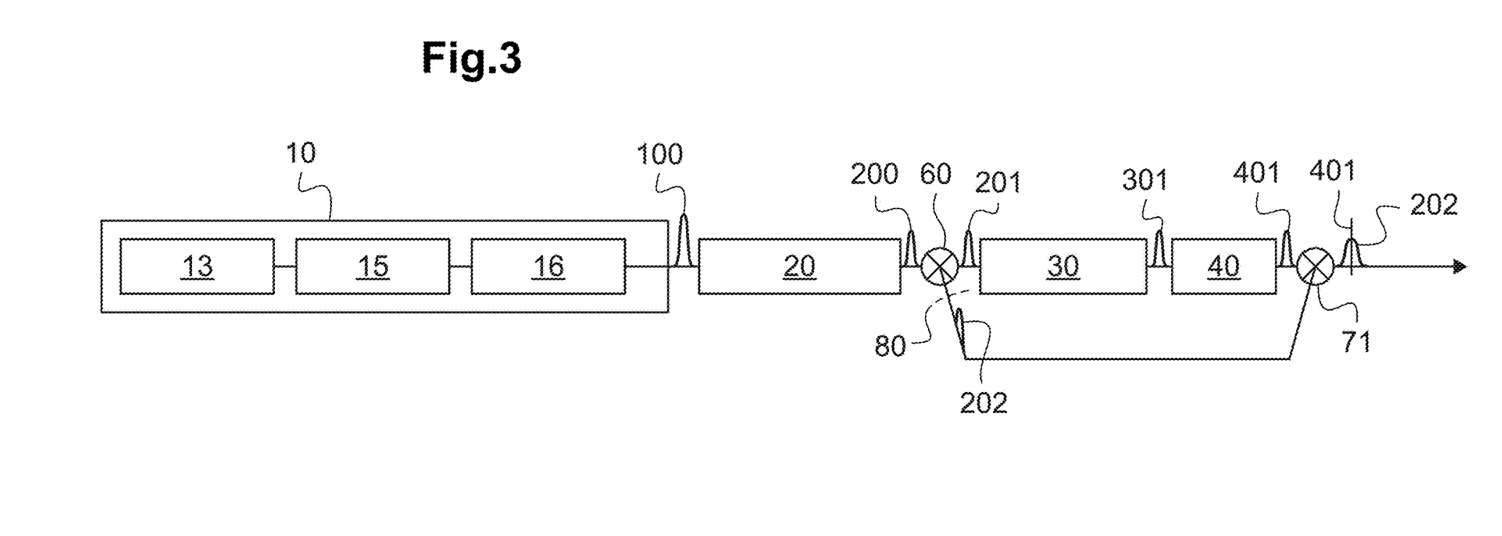

According to a variant illustrated in FIG. 3, the delay line 40 is disposed on the same branch as the compressor 30 upstream of the beam combiner 71. In this variant, the divided amplified pulse 201 is directed to the compressor 30 and the delay line 40 while the other divided amplified pulse 202 is directed directly to the beam combiner 71. In this case, the compressor 30 receives the divided amplified pulse 201 and delivers a compressed amplified pulse 301 which is of short duration. The optical delay line 40 receives the compressed amplified pulse 301 and transmits a compressed amplified pulse 401 delayed with a delay $\Delta t_2$ less than or equal to the duration $T_L$ of the other divided amplified pulse 202 which forms a long amplified pulse.

In the first embodiment illustrated in FIGS. 2 and 3, the beam combiner 71 is disposed downstream of the optical amplifier system 20 and of the delay line 40.

In the embodiment illustrated in FIG. 2, the beam combiner 71 recombines the compressed amplified pulse 301 with the delayed amplified pulse 402, which is of long duration, by overlapping them spatially and temporally with the relative delay $\Delta t_2$.

In the embodiment illustrated in FIG. 3, the beam combiner 71 recombines the compressed amplified pulse 401 delayed by the delay $\Delta t_2$ with the other divided amplified pulse 202 which is of long duration by overlapping them spatially and temporally with the relative delay $\Delta t_2$.

The beam combiner 71 is a passive optical component having two input channels and an output channel to spatially overlap the compressed amplified pulse 301, respectively 401, of short duration and the amplified pulse 402, respectively 202, of long duration, with a relative delay $\Delta t_2$ between the short compressed amplified pulse and the long amplified pulse.

In an exemplary embodiment, the beam combiner 71 comprises a coupler having at least two inputs and one output. The beam combiner 71 is adapted to amplitude overlap the short compressed amplified pulse 301, respectively 401, and the long amplified pulse 402, respectively 202, with the relative delay $\Delta t_2$. Alternatively, the beam combiner 71 comprises a polariser configured to polarisation-recombine the short compressed amplified pulse according to one polarisation state with the long amplified pulse according to another polarisation state. According to another variant, the beam combiner 71 comprises a dichroic mirror or filter or an interference filter, adapted to recombine the short amplified pulse at one wavelength and the long amplified pulse at another wavelength.

In a particular embodiment, the beam combiner 71 can also allow varying and adjusting the amplitude of the short amplified pulse relative to the amplitude of the long amplified pulse. However, the introduction of this amplitude adjustment function at this level is likely to induce losses and a decrease in the maximum accessible power.

Figure 4:
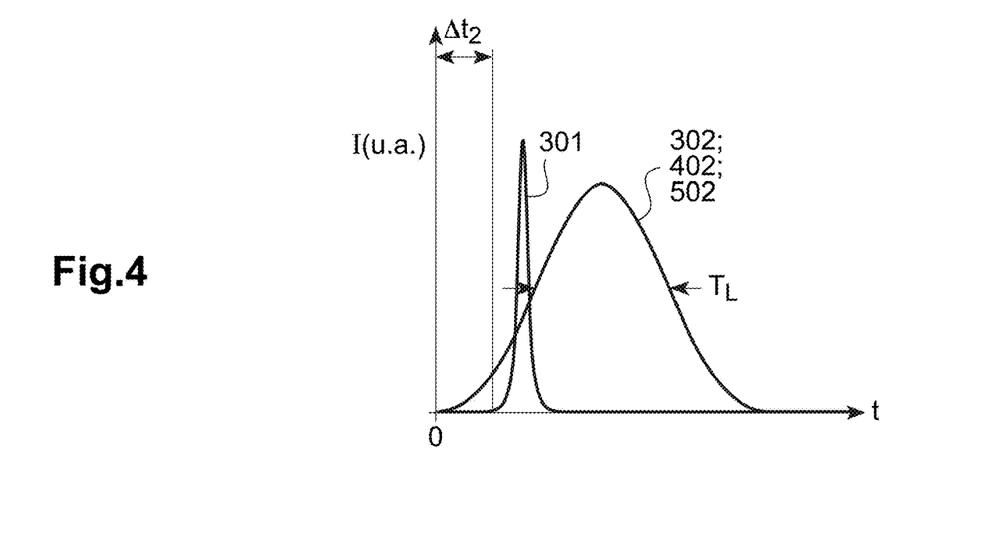

In an exemplary embodiment, the optical delay line 40 adds a fixed and predetermined delay $\Delta t_2$. The optical delay line 40 is made from optical components, for example mirrors, to allow obtaining a delay $\Delta t_2$ comprised in a range between 1 ps and 100 ns with an accuracy better than 200 femtoseconds. The optical delay line 40 allows overlapping the short compressed amplified pulse 301, or respectively 401, with a long amplified pulse 402, or respectively 202. The temporal position of the short compressed amplified pulse relative to the long amplified pulse is accurately determined depending on the delay $\Delta t_2$, as illustrated in FIG. 4. In FIG. 4, the delay $\Delta t_2$ is indicated in absolute value between the start of the short compressed amplified pulse and the start of the long amplified pulse at the input of beam combiner 71. In the present document, by the term "start of a pulse" means the moment when the intensity of the pulse is equal to a predetermined fraction of the maximum of this pulse, for example 10% of the maximum.

Advantageously, the delay $\Delta t_2$ is greater than or equal to a quarter or to half or even to three quarters of the long duration $T_L$ of the other divided amplified pulse 202, which forms a long amplified pulse. For example, for a long pulse of duration equal to 100 ns, the delay $\Delta t_2$ is at least 25 ns and preferably at least 50 ns. In this manner, the long amplified pulse irradiates the exposed material before the start of the short amplified pulse.

According to a particular and advantageous variant, the optical delay line 40 has a variable delay $\Delta t_2$, which allows adjusting the delay between the short amplified and compressed pulse and the long amplified pulse. A variable optical delay line 40 is for example made simply by means of several mirrors, one of the mirrors being mounted on a motorized translation stage to obtain a variation in the length of the optical path and therefore an adjustable delay between the short amplified pulse and the long amplified pulse.

An advantage of the first embodiment is to deliver the short compressed amplified pulse and the long amplified pulse on two spatially separated channels after amplification. This separation allows independently modifying the short amplified and compressed pulse and/or the long amplified pulse before recombining them via the beam combiner 71.

Figure 14:
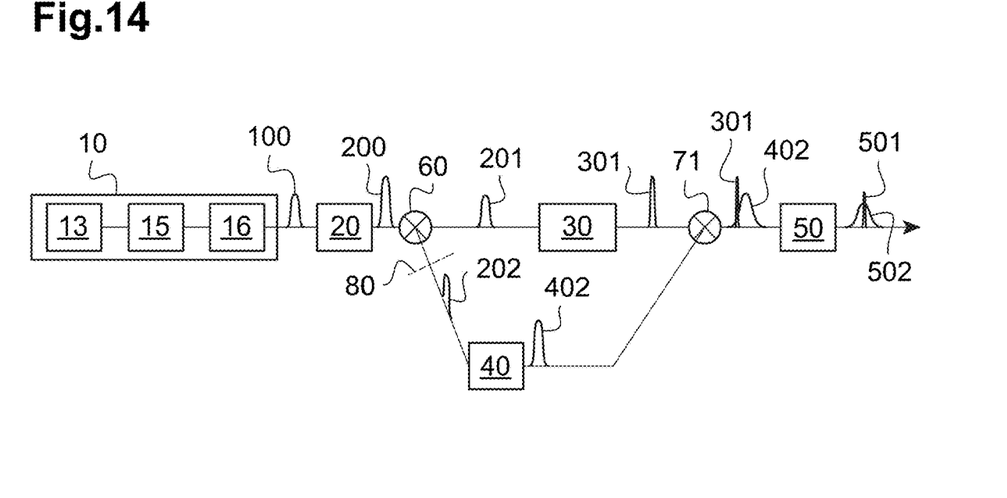
FIG. 14 is based on FIG. 2 with additional element 50.
Figure 16:
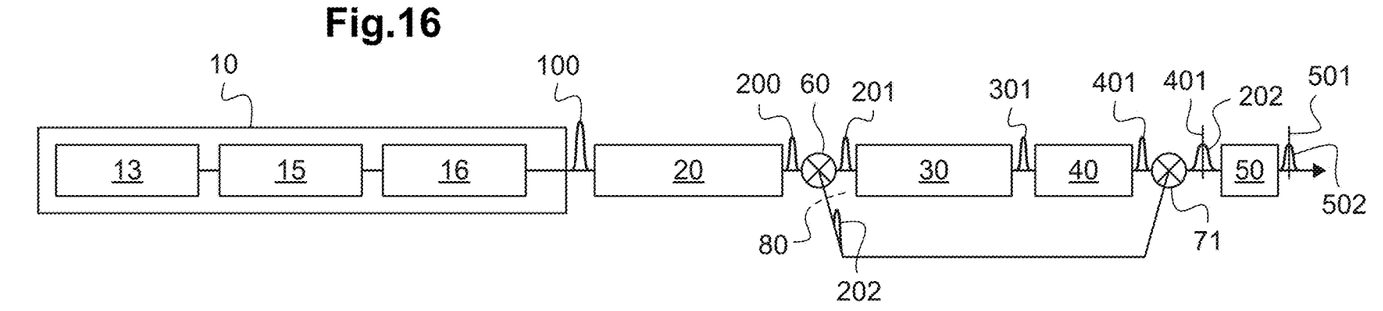
FIG. 16 is based on FIG. 3 with additional element 50.

According to a variant of the first embodiment, the laser system further includes a nonlinear optical frequency converter 50 disposed downstream of the beam combiner 71. The nonlinear optical frequency converter 50 is for example a sum frequency generator, second frequency generator or more generally a multiple harmonics generator. For example, the nonlinear optical frequency converter 50 includes one or more frequency doubling crystals for changing the wavelength. Thus, it is possible for example to pass from an initial wavelength of 1030 nm to a wavelength of 515 nm by frequency doubling (or SHG for "second-harmonic generation") or of 343 nm at the triple frequency or of 257 nm at the quadruple frequency. Such a nonlinear optical frequency converter 50 is very sensitive to the peak power of the incident beam. By placing the frequency doubling crystal(s) at the end of the chain, the frequency conversion of the more energetic short pulse, that is to say of the short amplified pulse 301, into a frequency converted short amplified pulse 501 is promoted. In this case, the long amplified pulse is not converted in optical frequency. The nonlinear optical frequency converter 50 thus allows selectively frequency converting the short amplified pulse independently of the long amplified pulse. The nonlinear optical frequency converter 50 does not introduce an additional time shift between the frequency converted short amplified pulse 501 and the long amplified pulse.

Figure 15:
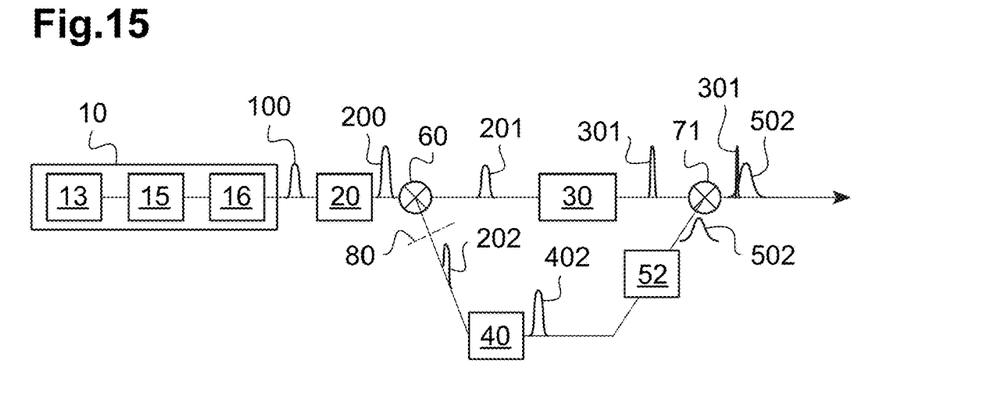
FIG. 15 is based on FIG. 2 with only additional element 52.
Figure 17:
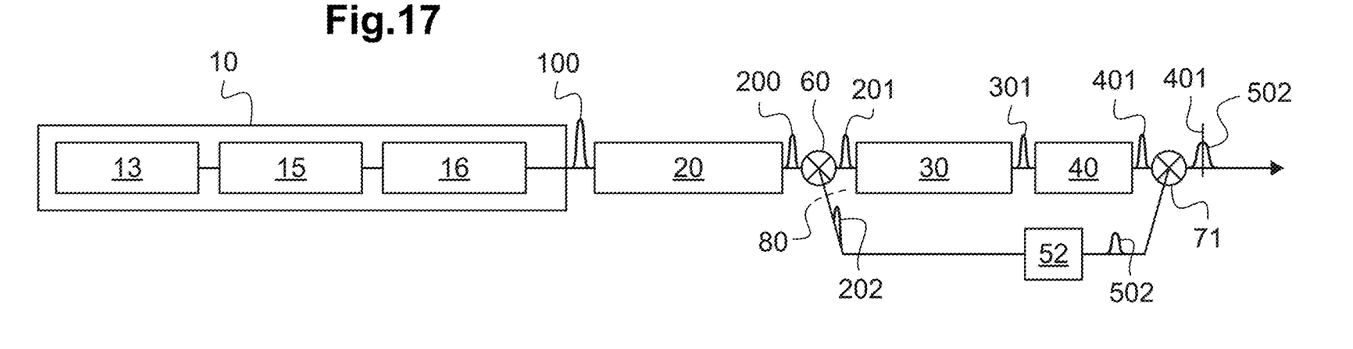
FIG. 17 is based on FIG. 3 with additional element 52.

Alternatively or complementarily, there is another nonlinear optical frequency converter 52 on the path of the other divided amplified pulse 202, so as to frequency convert the long amplified pulse 202, or the delayed long amplified pulse 402, upstream of the beam combiner 71 to form a frequency converted long amplified pulse 502, for example doubled or tripled in optical frequency. The nonlinear optical frequency converter 52 allows the long amplified pulse to be converted in optical frequency independently of the short amplified pulse.

In all cases, it is generally appropriate to add a dichroic mirror downstream of each nonlinear optical frequency converter 50 and/or 52 to eliminate the fraction of the unconverted incident energy, in particular the wavelengths of the residual beam in the infrared.

Figure 10:
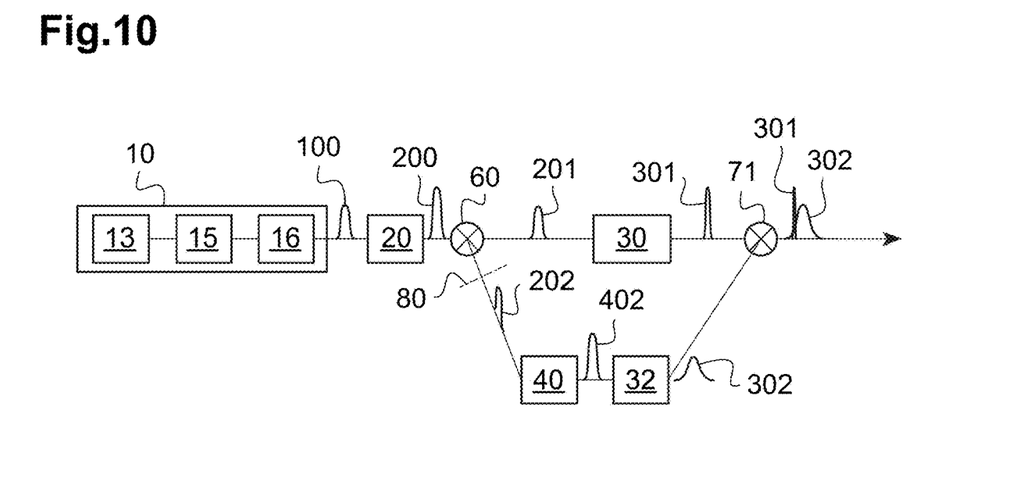
FIG. 10 is based on FIG. 2 with additional element 32.
Figure 11:
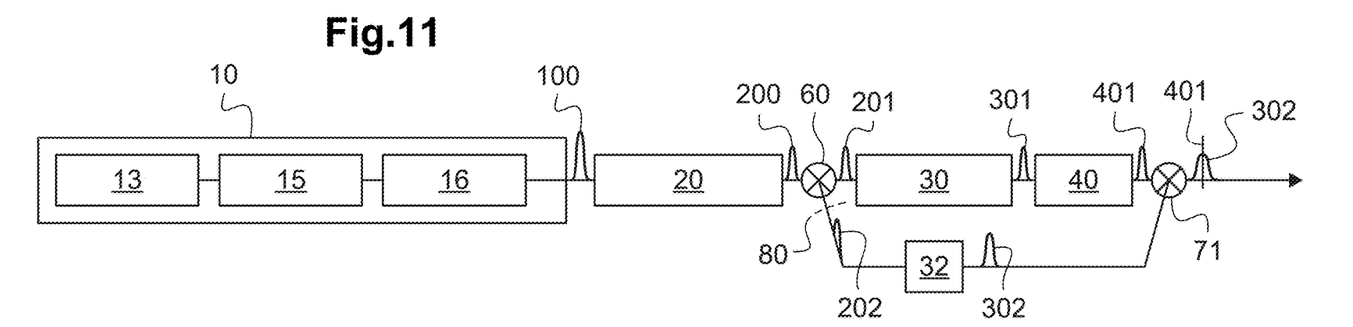
FIG. 11 is based on FIG. 3 with additional element 32.

According to a variant of the first embodiment, the laser system further includes another compressor 32 on the path of the other divided amplified pulse 202, so as to temporally compress the long amplified pulse, that is to say the long amplified pulse 202 or 402, upstream of the beam combiner 71 and form another compressed amplified pulse 302 having a long duration less than 100 ps, for example comprised between 1 ps and 70 ps. This variant allows temporally compressing the long amplified pulse independently of the short amplified pulse, for example to adjust the duration ratio between the short amplified pulse and the long amplified pulse.

In summary, the first embodiment allows applying a relative delay between the short amplified pulse and the long amplified pulse, which are amplified in the same optical amplifier system 20. Optionally, the first embodiment allows frequency converting the short amplified pulse independently of the long amplified pulse and vice versa.

FIG. 4 illustrates an example of temporal overlap of a short amplified pulse 301 and a long amplified pulse 302, 402 or 502 obtained by means of a laser system according to the first embodiment, the short amplified pulse 301 and the long amplified pulse being temporally shifted by the relative delay $\Delta t_2$ so that the material to be machined is exposed at the start of the long amplified pulse for a duration equal to the relative delay $\Delta t_2$ before being exposed to the short amplified pulse.

In one exemplary application of the first embodiment, the compressed amplified pulse 301 has a short duration Tc comprised between about 100 fs and 500 fs. The injector 10, the optical amplifier system 20 and the beam splitter 60 form the divided amplified pulse 201 and the other divided amplified pulse 202, of duration $T_L$ comprised between 20 ps and a few hundred ns, between 5 ns and 100 ns, or between 20 ps 1 ns, or between 20 ps and 700 ps, and for example between 50 ps and 150 ps. The compressor 30 compresses the divided amplified pulse 201 to form the compressed amplified pulse 301 of short duration Tc comprised between 100 fs and 500 fs. The optical delay line 40 delays the other divided amplified pulse 202 and forms the long amplified pulse 402 delayed by $\Delta t_2$. The optical delay line 40 allows adjusting the delay $\Delta t_2$ between the short compressed amplified pulse 301 and the long amplified pulse 402. The beam combiner 71 spatially and temporally overlaps the short amplified pulse 301 and the long amplified pulse 402 with the delay $\Delta t_2$. The laser system has for example an average power of 100 W. The total energy of the amplified pulses 301 and 402 is preferably adjustable between 100 µJ and 50 mJ. The energy distribution is for example 50/50 between the short amplified pulse 301 and the long amplified pulse 402. Of course, another adjustment of the beam splitter 60 and/or of the beam combiner 71 allows obtaining another distribution of energy between the short amplified pulse 301 and the long amplified pulse 402. The rate of the injector 10 is comprised between about 100 kHz and 2 MHz. At the rate of 100 kHz, the energy made available is 1 mJ per 100 W of average power. Optionally, another compressor 32 disposed on the optical delay line 40 upstream of the beam combiner 71 allows reducing the duration of the long amplified pulse 402 to a value less than 70 ps.

At the output of the beam combiner 71, a temporal overlap of an amplified pulse of short duration, generally femtosecond, and of a long amplified pulse, of ps or ns duration, with a delay $\Delta t_2$ which is preferably adjustable, is obtained. This temporal overlap of a short compressed amplified pulse and a long amplified pulse allows new laser-matter interaction regimes to be achieved. In particular, the application of the start of a long pulse allows heating the material, and changing the ablation threshold thereof, then the temporal overlap of a short pulse allows ablating the material more efficiently than with a short pulse alone.

Indeed, the laser methods in ultra-short mode are known to implement several types of laser-matter interaction mechanisms acting on different time constants, either rather short (fs/ps) or longer (ns/µs/ms). In particular, the consequences of the laser irradiation on the kinetics of temperature rise and/or ablation of materials are very dependent on the duration of the pulses.

In addition, the possibility of having different wavelengths for the compressed amplified pulse 301, 401, 501 of short duration and/or the amplified pulse 302, 402 or 502 of long duration by sum frequency generation allows obtaining a double or triple optical frequency, in other words a wavelength divided by 2 or 3. This optical frequency conversion allows having an additional parameter for monitoring these mechanisms of laser-matter interaction, and in particular of the laser ablation.

This temporal shaping, also due to the physical features of the interaction, allows the distribution of the energy applied to a material to be controlled over time.

In summary, the laser system according to the first embodiment allows delivering at least two pulses amplified by the same optical amplifier system and temporally overlapped, an amplified pulse being of short duration, preferably femtosecond, and another amplified pulse being of long duration, picosecond or nanosecond, the amplified pulse of short duration being applied with a time delay relative to the long pulse, the time delay being less than the duration of the long pulse.

Figure 5:
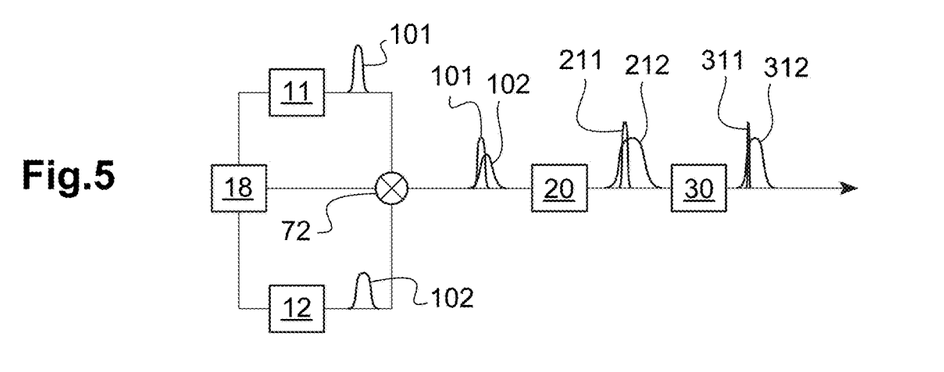

FIG. 5 schematically represents a second embodiment of a pulse laser system.

This second embodiment is based on the combination of two injectors: an injector 11, preferably similar to the injector 10 described in connection with FIG. 2 and another injector 12 or auxiliary injector. The injector 11 delivers a source pulse 101 of short femtosecond duration. The other injector 12 delivers another source pulse 102, of long picosecond or nanosecond duration. Depending on the choice of duration for the long pulse, the other injector 12 may include a stretcher. The compressor 30 is generally adapted to the stretcher of the injector 11 to generate a compressed pulse 311 of femtosecond duration. Optionally, the injector 11 and/or the other injector 12 include an optical preamplifier.

An electronic synchronisation system 18 allows electronically adjusting the delay $\Delta t_2$ between the short source pulse 101 and the other long source pulse 102. The accuracy of a delay obtained by electronic means is generally lower than by an optical means such as an optical delay line. This accuracy is in the range of 1 ns with a conventional electronic system. However, an existing more elaborate electronic system allows obtaining accuracy up to one hundred picosecond. In the case where the other source pulse 102 has a long duration greater than or equal to 1 ns, such an accuracy is very suitable. A high accuracy electronic device (called "synchrolock") is also known, which allows a synchronisation in the range of fs and which is suitable for example for an injector 12 of the mode-locking oscillator type operating in the MHz or GHz range.

In the second embodiment, a beam combiner 72 is disposed upstream of the optical amplifier system 20. The beam combiner 72 spatially and temporally overlaps the short source pulse 101 and the other long source pulse 102 with the delay $\Delta t_2$ defined by the synchronisation system 18.

The beam combiner 72 advantageously comprises a polariser, the injector 11 generating a short source pulse 101 polarised according to a polarisation state and the other injector 12 generating another long source pulse 102 polarised according to another transverse polarisation state. Alternatively, the beam combiner 72 is a spectral component, for example a dichroic mirror or an interference filter.

Figure 13:
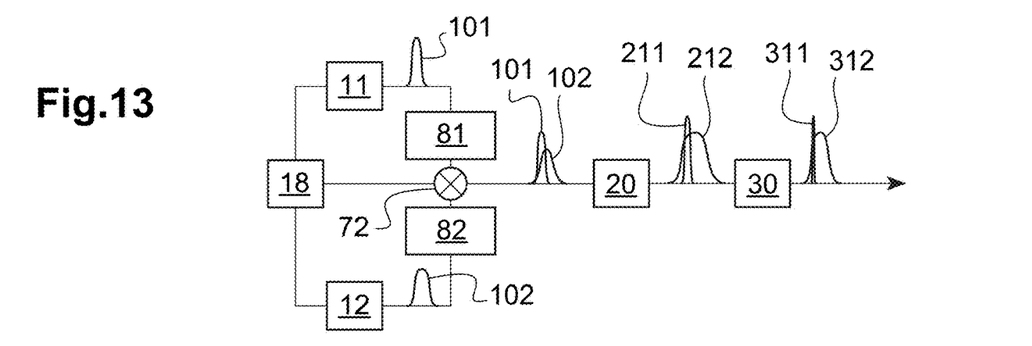
FIG. 13 is based on FIG. 5 with additional elements 81, 82.

According to a particular and advantageous aspect, an attenuator 81, respectively 82, is disposed between the beam combiner 72 and the injector 11, respectively the other injector 12. The attenuator 81, respectively 82, allows adjusting the energy of the short source pulse 101, respectively of the other long source pulse 102. Alternatively, the energy adjustment can also be done by the beam combiner 72. For this purpose, the attenuator or the beam combiner can be selected from a dichroic mirror which allows modifying the transmission/reflection curve depending on the angle of incidence, an interference filter of variable spectral width or else a polarising component. The energy adjustment of the short source pulse 101 and/or the other long source pulse 102 allows adjusting the proportion of the contribution of the short source pulse and of the other long source pulse in the overlap obtained at the output of the laser system.

In an example of the second embodiment, the short source pulse 101 is of fs duration. A commercial high-bandwidth laser diode generates the other source pulse 102 of long duration $T_L$ ranging from 5 ns to several hundred ns. A shorter duration $T_L$ of 5 ns can be obtained through modifying the electronics. The spatial overlap of the source pulse 101 and the other source pulse 102 is non-adjustable. In particular, it is possible that the ns beam and the fs beam are not exactly the same size due to the Kerr effects on the fs pulse. Downstream of the beam combiner 72, the short source pulse 101 and the other long source pulse 102 are overlapped at least partially spatially and temporally with a relative delay. More specifically, the short source pulse 101 is overlapped on the other long source pulse 102 after a time lag or delay, this time lag or delay being less than the duration of the other long source pulse 102.

The duration of the other source pulse 102 can be adjusted between 5 ns and several hundred ns. Nevertheless, if the duration of the other long source pulse 102 is greater than 300 ns, the maximum accessible rate can be reduced.

The electronic synchronisation system 18 allows electronically adjusting the delay between the short source pulse 101 and the other long source pulse 102, with an accuracy in the range of 1 ns.

The total cumulative energy of the short source pulse 101 and the other long source pulse 102 is variable from 1 µJ to 50 mJ.

The optical amplifier system 20 simultaneously amplifies the short source pulse 101 and the other long source pulse 102. In other words, the two short and long source pulses are amplified in the optical amplifier system 20 which generates a short amplified pulse 211 and another long amplified pulse 212. The short amplified pulse 211 and the other long amplified pulse 212 are spatially overlapped. In addition, the short amplified pulse 211 is temporally overlapped after the delay of the electronic synchronisation system 18 on the other long amplified pulse 212. Thus, the material to be machined is exposed at the start of the other long amplified pulse 212 for a duration equal to the delay before being exposed to the short amplified pulse 211.

Figure 8:
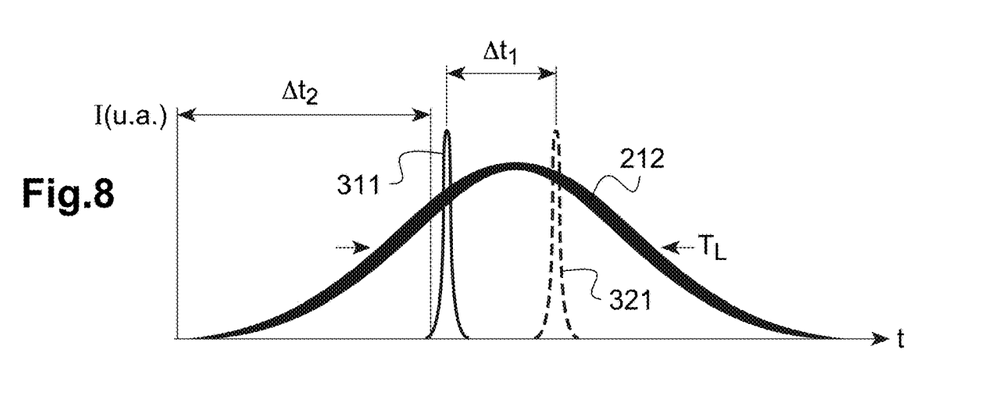

Optionally, a compressor 30 receives the short amplified pulse 211 and the other long amplified pulse 212 overlapped. However, the compressor 30 is generally optimised for the temporal compression of the short amplified pulse 211 so as to generate a compressed amplified pulse 311 of short duration. The other injector 12 comprises, for example, a very narrow spectrum nanosecond diode. In this case, the compressor 30 does not compress the other long amplified pulse 212. The other long amplified pulse 212 is therefore found at the output of the compressor 30. The compressor 30 therefore generates an overlap of the other long amplified pulse 212 and the compressed amplified pulse 311 which has a short duration Tc comprised between 100 fs and a few ps. When the repetition period of the injector 11 is less than the duration of the other long amplified pulse 212, it is possible to overlap several compressed amplified pulses of short duration on the same long amplified pulse 212. Thus, FIG. 8 illustrates the overlap of two compressed amplified pulses 311, 321 on the same long amplified pulse 212. The first compressed amplified pulse 311 is applied with a delay $\Delta t_2$ after the start of the long amplified pulse 212. The second compressed amplified pulse 312 is applied with a delay $\Delta t_1$ after the first compressed amplified pulse 311 is applied with a delay $\Delta t_2$. The sum of the delays $\Delta t_2$ and $\Delta t_1$ is less than the duration of the long amplified pulse 212. Alternatively, the compressor 30 is adapted to temporally compress the other amplified pulse 212, for example of duration in the nanosecond range and form another compressed amplified pulse 312 of long duration in the picosecond range.

Alternatively, the laser system does not include a compressor downstream of the optical amplifier system. This variant is particularly suitable for the case where the injector 11 generates source pulses 101 having a duration of a few hundred picoseconds and where the other injector generates other source pulses 102 having a duration comprised between a few nanoseconds and a few hundred nanoseconds. In this case, the optical amplifier system directly generates an amplified pulse 211 of short duration, of a few hundred picoseconds, temporally overlapped with another amplified pulse 212 of long duration comprised between a few nanoseconds and a few hundred nanoseconds.

Figure 12:
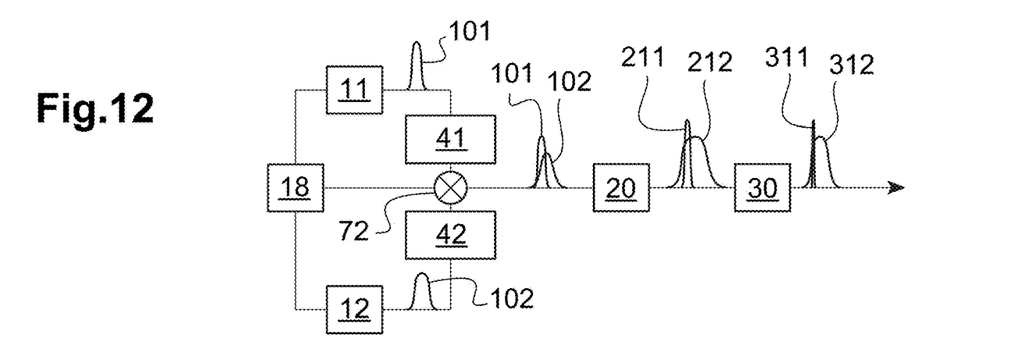
FIG. 12 is based on FIG. 5 with additional elements 41, 42.

According to another variant of the second embodiment, there is also an optical delay line 41 in the injector 11 or an optical delay line 42 in the other injector 12. This variant concerns more particularly the case where the other source pulse 102 has a duration in the ns range or less than 1 ns. The adjustment of the optical delay line 41 or 42 allows correctly positioning the temporal overlap of the short source pulse 101 and of the other long source pulse 102 according to the diagram of FIG. 8. It is also possible to provide fixed delays by means of optical fibers of calibrated length in order to obtain a predetermined delay.

Figure 18:
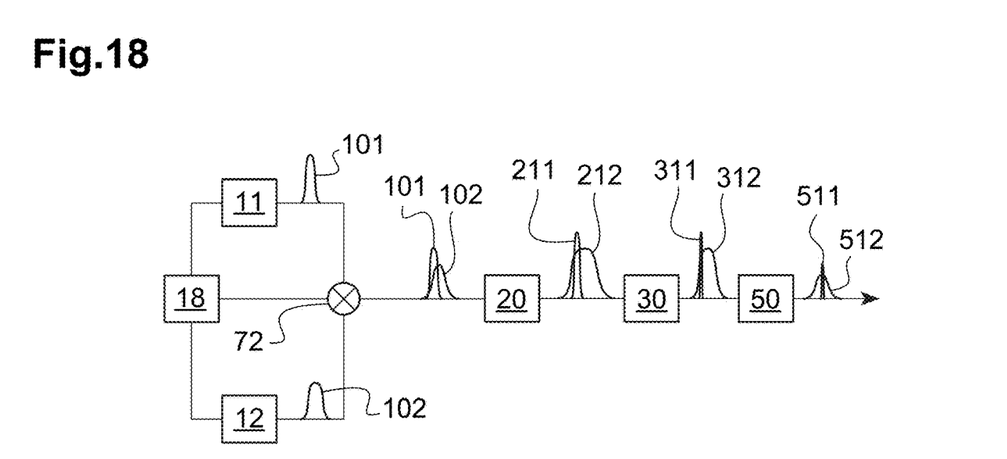
FIG. 18 is based on FIG. 5 with additional element 50.

According to yet another variant of the second embodiment, the laser system further comprises a nonlinear optical frequency converter 50 disposed downstream of the compressor 30. The nonlinear optical frequency converter 50 is for example a sum frequency generator, second frequency generator or more generally a multiple harmonics generator. The nonlinear optical frequency converter 50 receives a compressed amplified pulse 311 and another long amplified pulse 212 which are temporally overlapped. Such a nonlinear optical frequency converter 50 is very sensitive to the peak power of the incident beam. By placing the frequency doubling crystal(s) at the end of the chain, the frequency conversion of the more energetic pulse of shorter duration, that is to say of the compressed amplified pulse 311, into a short-duration frequency converted amplified pulse 511 is promoted. In this case, the other long amplified pulse 212 is not converted in optical frequency. The nonlinear optical frequency converter 50 thus allows selectively frequency converting the short amplified pulse independently of the other long amplified pulse. Alternatively, the nonlinear optical frequency converter 50 also converts the other long amplified pulse 212 into another frequency converted amplified pulse 512 of long duration.

Preferably, the injector 11 is similar to the injection system 10 comprising an oscillator 13, a stretcher 15 and an optical modulator 16, and described in connection with FIG. 2.

Figure 6:
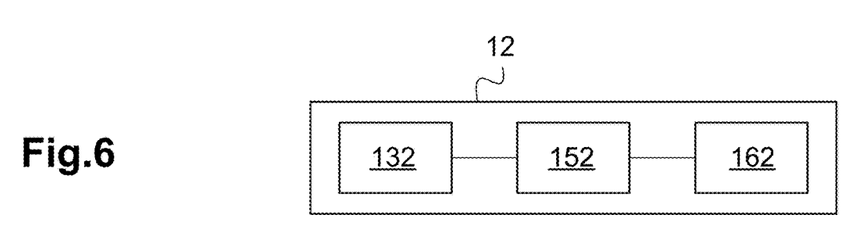

FIG. 6 represents an example of other injector 12 used in the second embodiment. This other injector 12 comprises an oscillator 132, an optional stretcher 152 and an optical modulator 162. In the case where the oscillator 132 delivers femtosecond pulses, this oscillator 132, associated or not with the stretcher 152, allows generating the other source pulse 102 of long duration comprised between a hundred femtoseconds and a hundred picoseconds. In the case where the oscillator 132 delivers picosecond pulses, the use of the stretcher 152 is not required. The electronic synchronisation system 18 synchronises, in time and in phase, the oscillator 132 of the other injector 12 with the oscillator 13 of the injector 11 by a controlled servo loop (called "synchro lock" and "phase lock" loop).

Figure 7:
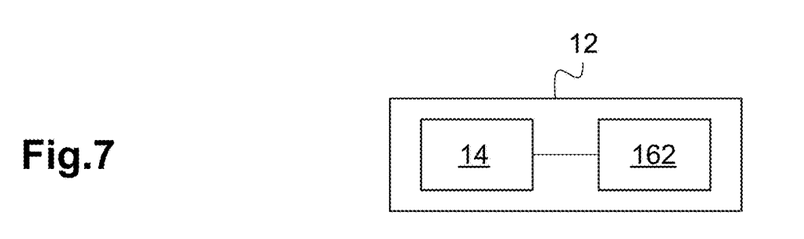

FIG. 7 represents another example of another injector 12 used in the second embodiment. This other injector 12 comprises a large bandwidth laser diode 14 and an optical modulator 162. The laser diode 14 can also be a gain switched diode whose short source pulse duration can be reduced down to 30 ps. The laser diode 14 directly generates the other source pulses 102 of nanosecond duration. In this case, a stretcher is unnecessary. The emission wavelength of the laser diode 14 is selected to be within the bandwidth of the optical amplifier system 20. In the case where the beam combiner 72 is a polariser, the polarisation state of the laser diode 14 is determined to allow the beam combiner 72 to overlap the short source pulse 101 with the long source pulse 102. In the case of a wide spectral band optical amplifier system, such as an optical fiber amplifier for example, the beam combiner 72 can also be a spectral component, for example a dichroic mirror or an interference filter.

The electronic synchronisation system 18 allows controlling the delay between the short source pulse 101 generated by the injector 11 and the other long source pulse 102 generated by the other injector 12. The accuracy of the electronic synchronisation system 18 is in the range of 100 ps for an FPGA electronic system. Alternatively, the continuous emitting laser diode 14 and the optical modulator 162 are used to modulate the intensity of the light emitted by the diode so as to generate the other long source pulse 102. This alternative allows obtaining a better accuracy of the overlap of the short source pulse 101 and the other long source pulse 102 only limited by the accuracy of the electronic synchronisation system.

In another variant, the other injector 12 is a microchip, of the triggered type operating at a rate controlled by the pump power, for example variable between 100 kHz and 1 MHz. In this case, the oscillator 13 of the injector 11 is synchronised on the rate of this integrated circuit or on a multiple of this rate.

FIG. 8 illustrates an example of pulse overlap obtained by means of a laser system according to the second embodiment, by temporal overlap of a short amplified pulse 311 and another long amplified pulse 212, the short amplified pulse 311 being temporally shifted by a delay $\Delta t_2$ relative to the other long amplified pulse 212. The shortest pulse, the amplified pulse 311, has a short duration Tc comprised between about 100 fs and a few ps. The other amplified pulse 212 has a long duration $T_L$ comprised between 5 ns to several hundred ns. The delay $\Delta t_2$ is less than the duration of the other long amplified pulse 212, and preferably less than half the duration of the other long amplified pulse 212. Optionally, at least one second short amplified pulse 321 is also temporally overlapped with the same other long amplified pulse 212. The delay between the short amplified pulse 311 and the second short amplified pulse 321 is for example equal to the repetition period of the injector 11.

According to a variant of the second embodiment, the injector 11 includes only an oscillator 13 delivering femtosecond pulses and an optical modulator 16 adapted to select a short source pulse 101. The other injector comprises a gigahertz source generating a train (or "burst") of M other gigahertz source pulses, M being a natural number, at the rate of the oscillator. For example, the other injector 12 comprises an oscillator 132 delivering a burst of M other femtosecond pulses at a gigahertz (GHz) rate, with an adjustable number M. In the present document, the term "gigahertz rate" means a rate, or repetition frequency, comprised between 0.1 GHz and a few tens of GHz. This type of oscillator allows directly delivering a burst of other source pulses, the duration $T_t$ of the wave train ranging from one nanosecond to one hundred nanoseconds. In the case where a burst of M other source pulses is selected, the electronic synchronisation system 18 possibly completed by an optical delay line 41 or 42 is adapted so that a short source pulse 101 is temporally overlapped with the burst of other pulses, the source pulse having a long duration envelope. Thus, the envelope of the burst of other GHz source pulses from the gigahertz source can be temporally overlapped on a short source pulse 101 with a relative delay $\Delta t2$ between the short source pulse 101 and the envelope of the burst of M other source pulses.

According to this variant of the second embodiment, the optical amplifier system 20 simultaneously amplifies the short source pulse 101 and the burst of other GHz source pulses to form an amplified pulse 211 and, respectively, a burst of other amplified pulses, temporally overlapped with the relative delay $\Delta t2$. At the output of the optical amplifier system 20, the compressor 30 temporally compresses the amplified pulse 211 and, respectively, the burst of other amplified pulses, and generates a compressed amplified pulse 311, of short duration, and, respectively, a burst 220 of other compressed amplified pulses 221, 222, . . . , 22M. The burst 220 of other compressed amplified pulses has a long duration envelope. The rate of the 220 of other compressed amplified pulses is identical to the rate of the GHz source. In this manner, the material to be machined is exposed at the start of the burst 220 of other compressed amplified pulses, the burst 220 having a long duration envelope, for a duration equal to the relative delay $\Delta t_2$ before being exposed to the compressed amplified pulse 311, of short duration.

The second embodiment has the advantage of spatially overlapping the short pulse and the long pulse or the pulse burst upstream of the optical amplifier system and the compressor. In other words, the laser system according to the second embodiment delivers the short pulse and the long pulse, or respectively the burst of pulses, overlapped on one and the same channel. The adjustment of the relative delay between the short compressed amplified pulse and the long amplified pulse or, respectively, the amplified pulse burst, is performed in the injection system 11, 12. The duration of the other long pulse or the burst of other pulses is for example in the range of 5 ns to several hundred ns.

The laser system of the present disclosure allows obtaining the overlap of one or more amplified pulse(s) called short amplified pulse(s), with a duration in the range of a few hundred femtoseconds, with another amplified pulse called long amplified pulse, with a duration comprised between a few tens of picoseconds and several hundred nanoseconds, the short pulse being applied after a delay relative to the start of the long amplified pulse. In an exemplary embodiment, a single short amplified pulse is spatially and temporally overlapped with a long amplified pulse.

Figure 9:
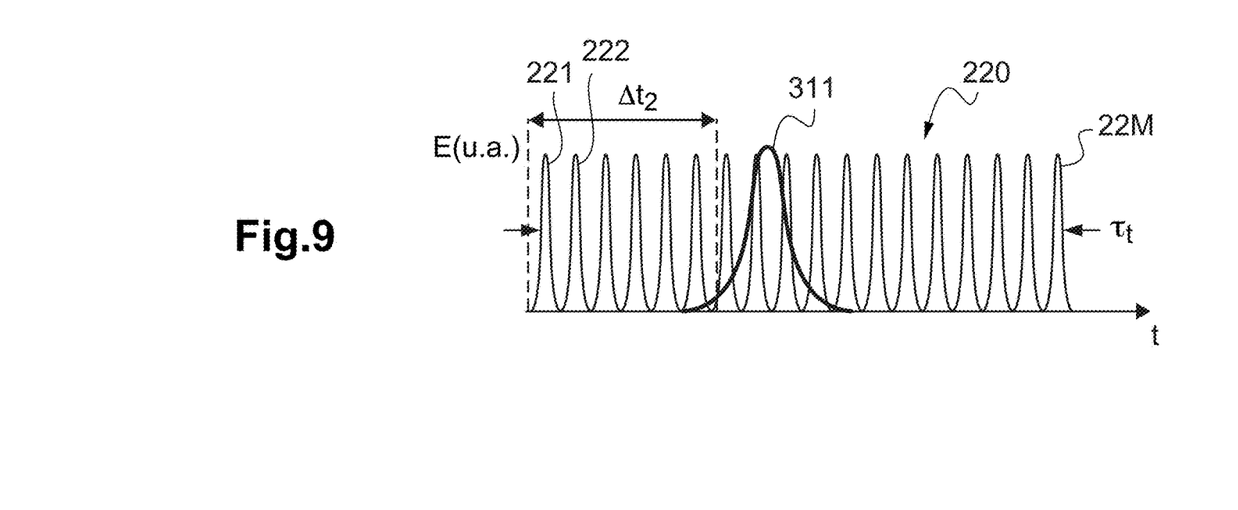

According to an example of the second embodiment, illustrated in FIG. 9, a compressed amplified pulse 311 of short duration is overlapped with a burst 220 of M other compressed amplified pulses 221, 222, . . . , 22M of short duration at very high rate, in the GHz range, the burst of M other GHz amplified pulses having an envelope of long duration $T_t$, comprised between a few tens of picoseconds and several hundred nanoseconds. Each amplified pulse 221, 222, . . . , 22M of the burst has a duration comprised for example between 100 fs and 500 fs. The start of the pulse burst 220 is herein defined as the start of the first pulse 221 of the burst 220.

The system of the invention allows temporally overlapping at least one amplified and compressed pulse of short duration and a longer amplified pulse, or respectively a long envelope burst of amplified pulses, by using one and the same system optical amplifier. This hybrid regime of both femtosecond or picosecond, for the compressed amplified pulse of short duration, and picosecond or nanosecond for the long amplified pulse, or respectively the long envelope burst of amplified pulses, provides additional parameters for a fine control of laser-matter interaction methods.

Of course, various other modifications can be made to the invention within the scope of the appended claims.

The invention claimed is:

1. A pulse laser system comprising an injection system, an optical amplifier system and a beam combiner, the pulse laser system being adapted to generate, on the one hand, an amplified pulse of short duration comprised between 100 fs and a few hundred picoseconds and, on the other hand, another amplified pulse of long duration or respectively a burst of other pulses amplified at a gigahertz frequency having a long duration envelope, the long duration being greater than the short duration and the long duration being comprised between a few picoseconds and several hundred nanoseconds, the amplified pulse of short duration and the other amplified pulse of long duration or respectively the burst of other amplified pulses of long duration envelope being from the same optical amplifier system and, the amplified pulse of short duration being, at the output of the pulse laser system, spatially and temporally overlapped with a relative delay with the other amplified pulse of long duration or respectively the burst of other amplified pulses of long duration envelope, the relative delay being less than or equal to the long duration, the relative delay being adjustable so that the amplified pulse of short duration is applied after said delay relative to the start of the other amplified pulse of long duration or respectively after said delay relative to the start of the burst of other amplified pulses.

2. The pulse laser system according to claim 1, wherein the injection system is adapted to generate a source pulse, the optical amplifier system is adapted to receive the source pulse and to generate an amplified pulse, the pulse laser system comprising a beam splitter having an input branch, an output branch and another output branch, the beam splitter being disposed to divide the amplified pulse and form a divided amplified pulse on the output branch and another divided amplified pulse on the other output branch, a compressor being disposed on the output branch and adapted to receive the divided amplified pulse and generate a compressed amplified pulse of short duration, an optical delay line being disposed on the output branch or on the other output branch to induce the relative delay and the beam combiner having an input connected to the output branch of the beam splitter in order to receive the compressed amplified pulse of short duration and another input connected to the other output branch of the beam splitter in order to receive the other divided amplified pulse of long duration.

3. The pulse laser system according to claim 2, further including another compressor disposed on the other output branch upstream of the beam combiner, the other compressor being adapted to temporally compress the other divided amplified pulse.

4. The pulse laser system according to claim 2, including a nonlinear optical system disposed on the other output branch of the beam splitter upstream of the beam combiner, the nonlinear optical system being adapted to wavelength-convert the other divided amplified pulse.

5. The pulse laser system according to claim 1, wherein the injection system comprises an injector, another injector and an electronic synchronisation system between the injector and the other injector, the injector being adapted to generate a source pulse of short duration comprised between 100 fs and a few hundred picoseconds, the other injector being adapted to generate another source pulse of long duration, the long duration being comprised between 5 ns and several hundred ns, the electronic synchronisation system being adapted to induce a delay between the source pulse and the other source pulse which is less than or equal to the long duration, the beam combiner being adapted to spatially and temporally overlap the source pulse and the other source pulse, the optical amplifier system being adapted to receive the source pulse and the other source pulse which are temporally overlapped and to generate an amplified pulse of short duration and another amplified pulse of long duration which are temporally overlapped.

6. The pulse laser system according to claim 5, comprising a compressor disposed downstream of the optical amplifier system, the compressor being adapted to receive the amplified pulse of short duration and generate a compressed amplified pulse of short duration.

7. The pulse laser system according to claim 5, wherein the other injector includes an oscillator or a laser diode or an integrated circuit laser source.

8. The pulse laser system according to claim 1, wherein the injection system comprises an injector, an other injector including an oscillator of the mode-locking oscillator type operating in the GHz range, and an electronic synchronisation system between the injector and the other injector, the injector being adapted to generate a source pulse of short duration comprised between 100 fs and a few hundred picoseconds, the other injector being adapted to generate a burst of other femtosecond pulses at a repetition frequency comprised between 0.1 GHz and a few tens of GHz, the burst of other femtosecond pulses having a long duration envelope comprised between 5 ns and several hundred ns, the electronic synchronisation system being adapted to induce a delay between the source pulse and the burst of other femtosecond pulses, the beam combiner being adapted to spatially and temporally overlap the source pulse and the burst of other femtosecond pulses, the optical amplifier system being adapted to receive the source pulse and the burst of other femtosecond pulses which are temporally overlapped and to generate the amplified pulse which is temporally overlapped with the burst of other amplified pulses, a compressor arranged the output of the optical amplifier system, the compressor being adapted to receive the amplified pulse and generate a compressed amplified pulse.

9. The pulse laser system according to claim 5, wherein the injector includes an oscillator and an optical modulator.

10. The pulse laser system according to claim 5, comprising an optical delay device disposed upstream of the beam combiner.

11. The pulse laser system according to claim 1, including an optical attenuator or an optical modulator adapted to amplitude modulate the amplified pulse of short duration and/or the other amplified pulse, respectively the burst of other amplified pulses.

12. The pulse laser system according to claim 1, wherein the beam combiner is one selected from an optical coupler, a polariser, a dichroic component, an interference filter or a nonlinear optical component.

13. A pulse laser system according to claim 1, including a nonlinear optical frequency converter disposed to receive the amplified pulse of short duration and generate a wavelength-converted amplified pulse of short duration.

14. The pulse laser system according to claim 3, including a nonlinear optical system disposed on the other output branch of the beam splitter upstream of the beam combiner, the nonlinear optical system being adapted to wavelength-convert the other divided amplified pulse.

15. The pulse laser system according to claim 6, wherein the injector includes an oscillator and an optical modulator.

16. The pulse laser system according to claim 7, wherein the injector includes an oscillator and an optical modulator.

17. The pulse laser system according to claim 8, wherein the injector includes an oscillator and an optical modulator.

18. The pulse laser system according to claim 6, comprising an optical delay device disposed upstream of the beam combiner.

19. The pulse laser system according to claim 7, comprising an optical delay device disposed upstream of the beam combiner.

20. The pulse laser system according to claim 8, comprising an optical delay device disposed upstream of the beam combiner.

* * * * *